Aug. 27, 1935. O. OHNESORGE 2,012,517
FRICTION DRIVE
Filed April 8, 1929 5 Sheets-Sheet 1

Inventor:
Otto Ohnesorge
By Bringer, Atty.

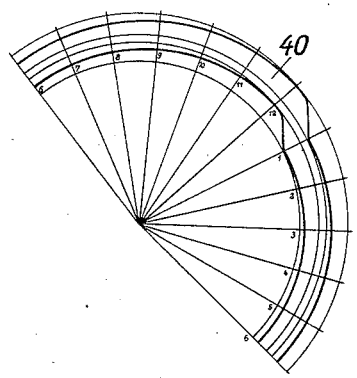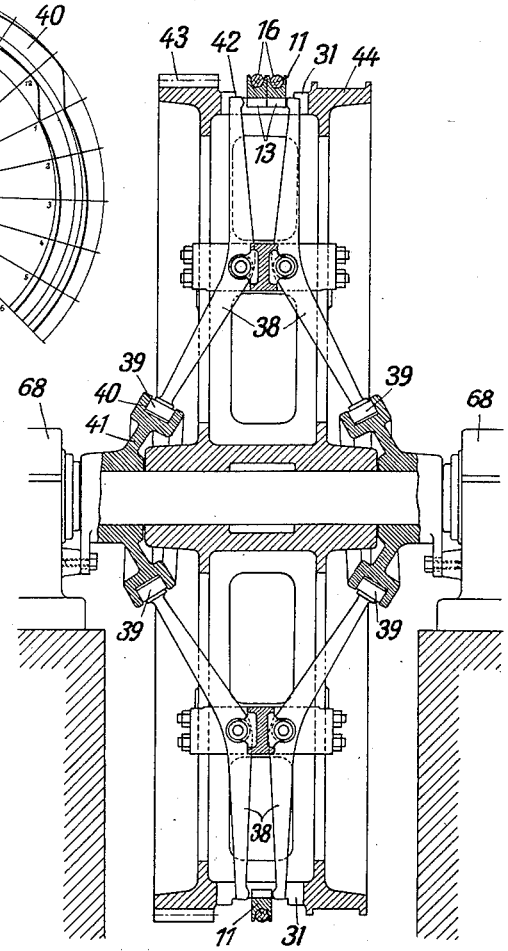

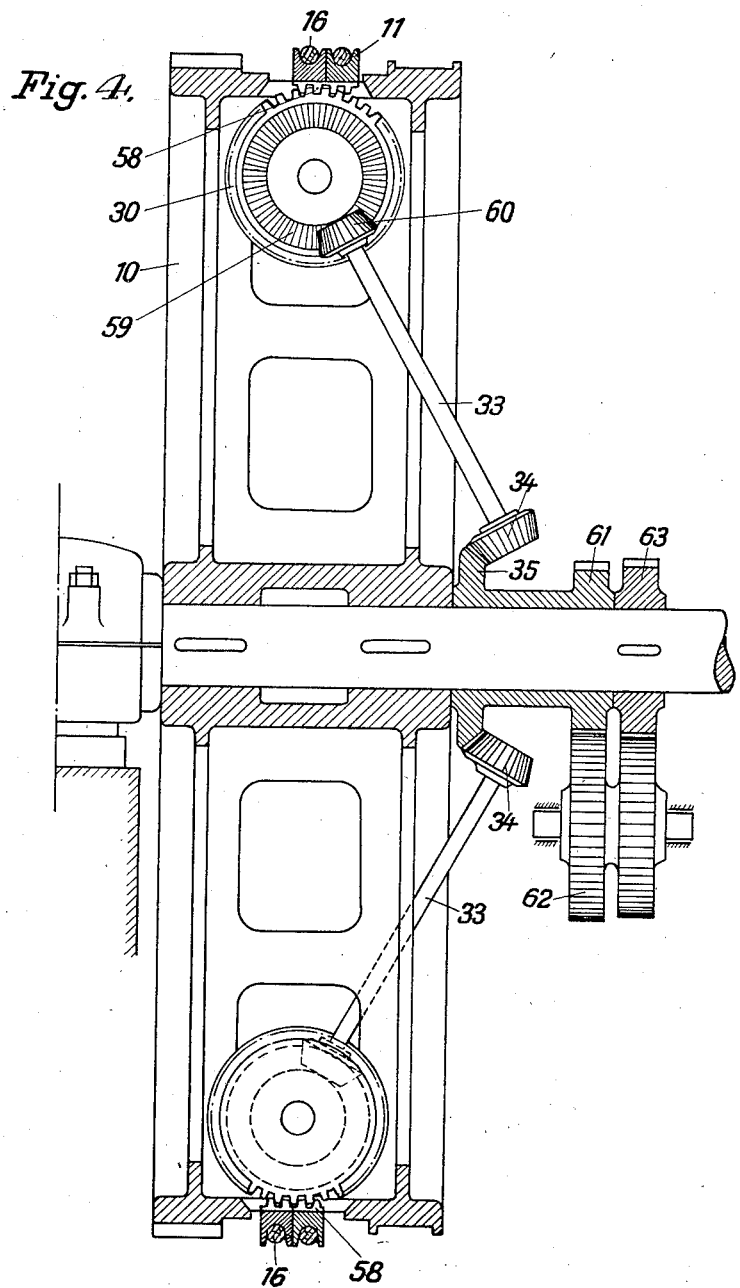

Aug. 27, 1935.   O. OHNESORGE   2,012,517
FRICTION DRIVE
Filed April 8, 1929   5 Sheets-Sheet 4

Patented Aug. 27, 1935

2,012,517

UNITED STATES PATENT OFFICE 2,012,517

FRICTION DRIVE

Otto Ohnesorge, Bochum, Germany

Application April 8, 1929, Serial No. 353,626
In Germany April 30, 1928

5 Claims. (Cl. 74—224)

Both in conveyor and in stationary motor plants it is in many instances necessary to increase the frictional cling or grip obtained by passing a rope, chain or similar pulling or tensile agency, mostly to the extent of one half but in some cases three-fourths around the periphery of a driving pulley. If with the above object it is proposed to pass the rope etc. completely round the pulley or even to a greater extent, the said pulling agency (rope etc.) must be guided in a spiral winding round the driving pulley or drum.

The object of this invention is to provide an improved friction drive for the pulling cable which passes over the entire periphery or more of a pulley, by which, no matter whether a drive of alternating or uniform direction of rotation is in operation, a continuous persistence of the loop or bight of the pulling cable in the same central plane is ensured without disturbances taking place incident to displacement of the pulling agency relatively to the pulley.

With the above and other objects in view, the invention consists in the construction, combination and arrangement of devices hereinafter described and claimed.

In the accompanying drawings

Figure 2 is a transverse sectional view of the same.

Figure 3 is a detail elevation of a portion of the fixed element which actuates the shifting elements.

Figure 4 is a transverse sectional view of a modified form of the invention.

Figure 1:
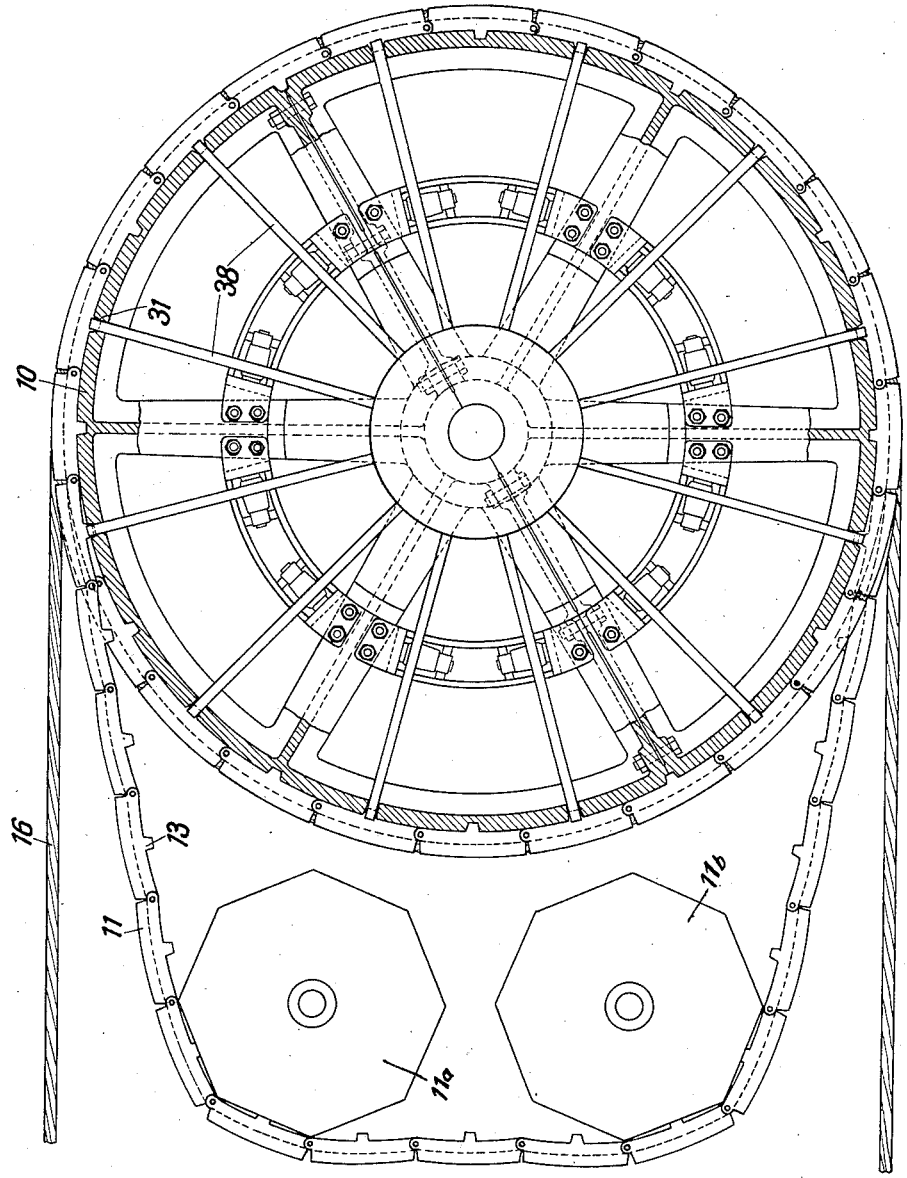
Figure 1 is an elevation partly in section of a friction drive mechanism constructed and arranged in accordance with my invention.

The frictional drum or pulley 10 is here shown as provided with transverse slots 31 in its crown and at one side of its periphery is provided with gear teeth 43 and the opposite side is here shown as circumferentially grooved as at 44 for engagement by a power transmitting belt.

An endless band or chain 11 is composed of a number of shoe links hingedly connected together and provided on their inner sides each with a tooth 13 which engage in transverse notches 42 with which the pulley is provided. The said band 11 has a portion thereof looped about the periphery of the pulley in several turns or convolutions and also engages idle pulleys 11ª, 11ᵇ. The endless cable 16 engages longitudinal grooves in the outer sides of the shoe links of the endless band as shown in Figure 2, so that the endless band is interposed between the cable and the periphery of the drum.

Mounted in the drum or pulley 10 are radially arranged crank levers 38 the heads of which are guided in the slots 31 of the crown of the drum and come into engagement with the projections 13 of the shoes 11. These levers are the shifting elements to operate the shoe links of the band and are distributed around the entire circumference of the pulley or drum as shown. In order to loop the band a number of times around the driving pulley, it is necessary to carry out the transverse displacement thereof over the entire circumference of the pulley and not in a locally restricted place and that such shifting of the chain or band over the entire circumference of the pulley be carried out by elements or means which are supported on the pulley itself and which are therefore carried by and moved with the pulley when the latter moves. The levers 38 effect this. The crank levers are provided with rollers 39 which run in a groove 40 lying on a corresponding conical casing, which groove is in a body 41 which is centered by the shaft of the drum 10 and is held against twist by the bearing 68. This groove 40 shown in developed form in Fig. 3 forms a spiral stationary in space which effects a gradual displacement of the shoe chain 11 over the major portion of the periphery, while, shortly in front of the particular point of entry of the length of chain the lifting off of the heads of the lever 38 from the chain of shoes takes place and then after they have been placed against the newly entered length of chain, the work of displacement is begun anew. In this manner the summing up of all inaccuracies if any is avoided: if the path described is too small then a slight friction would take place between the two lengths of the shoe chain coming to lie against each other, if it is too great then the second length would only place itself against the first somewhat later than corresponds to the theory; as this is quite harmless it is advisable so to dimension the entire device from the outset that the particular transverse displacement by the shifter device is slightly greater from the outset than the width of shoe.

In order hereto to reduce the number of parts which is of particular importance in reversing drives only each second shoe 11 is actuated each time by the levers 38, this being done in its centre, so that the shoe lying between is carried along by the two others. As is straightway evident this is perfectly permissible because this still provides with certainty for the several shoes to be carried over the entire periphery. Only at the particular point of entry of the chain of shoes, where the lifting off of the levers from the shoes 11 takes place, will the chain then be free over some length. In order, however, to limit suitably the free lengths lateral limits 42 are suitably provided on the periphery of the drum, which each time take up at this point temporarily the duty of the displacing levers.

If this arrangement is used for a reversing drive then a certain disagreement would thereby result between forward run and backward run, because these two would now not exactly coincide. This can, however, be obviated, as illustrated in Fig. 2 by providing a certain amount of play between the shifter device for forward running and that for backward running. This play or backlash (slop) will, in the present case, not result in an impact or blow because it only permits of a slight lateral travel of the chain of shoes and the loop of rope before the shifter edvice comes into action. By permitting this entirely harmless lateral travel the jammings which would result from the above mentioned disagreements just as in all so-called mechanisms in an over-rigidly closed circle are obviated.

This form of the invention, in addition to the advantageous features in principle described above, shows a further advantage because the driving crown 43 and the brake crown 44 can now be directly connected with the friction drum 10 as is the case with wire rope haulage or tram-lines in mines. If the rollers 39 are themselves made to run on roller bearings, then the frictional work will even be reduced much further.

The same idea may also be carried into effect by a continuously operating shifter gear as illustrated in cross-section in Fig. 4. The shoes 11 which run on to the driving pulley 10 and form the groove for the rope 16 have teeth 58 of a pitch proportional to the distance between the adjoining lengths of pulling rope in the ratio of 1 to 1, 1 to 2, etc., in which the crown wheel 30 arranged with a certain pitch in the drum engages. By the aid of pairs of bevel wheels 59, 60, and shafts 33, the spur wheels 30 are engaged with the bevel wheel pairs 34, 35, of which 35 is a central wheel revolving loosely on the shaft. This latter wheel again by its toothed crown 61 is in engagement with the gear wheel 62 mounted stationary, the second toothed rim of which meshes with the central pinion 63 fixed on the shaft. Owing to the difference between the ratios of these spur wheel bearings a differential gear is produced by which on rotation of the pulley 10 the shoes 11 are each time shifted by one width. In this way, therefore, for both directions of revolution, a constant displacement of the chain of shoes as it runs on is provided so that the groove for the rope 16 represents an accurate spiral always lying in the same central plane.

Figure 5:
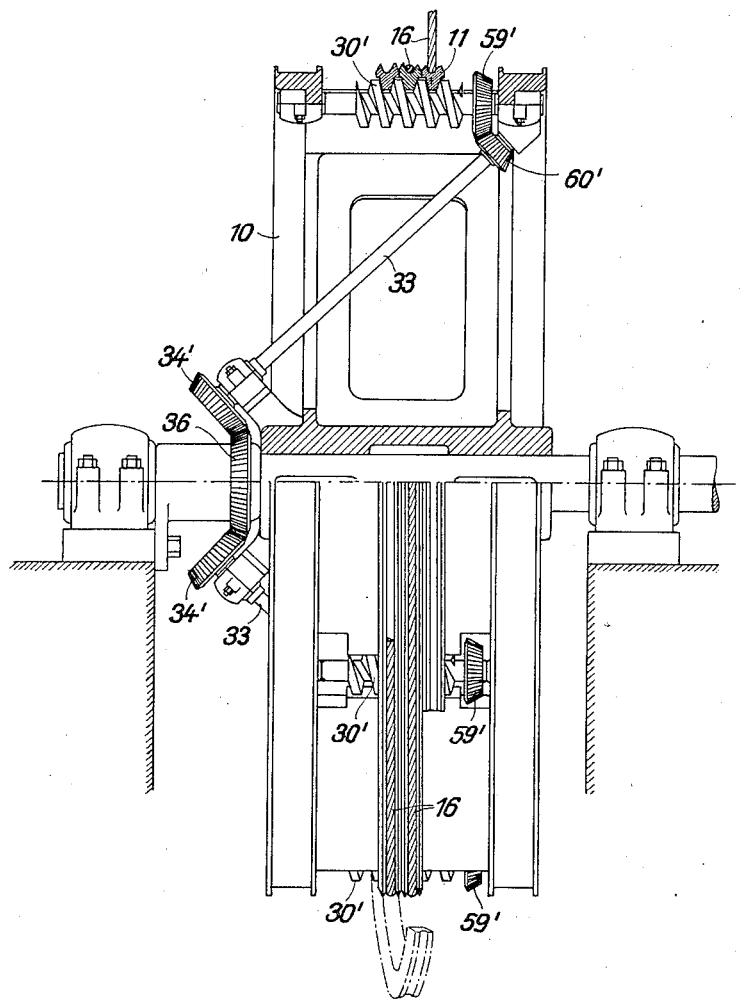
Figure 5 is a similar view of another modified form of the invention.
Figure 6:
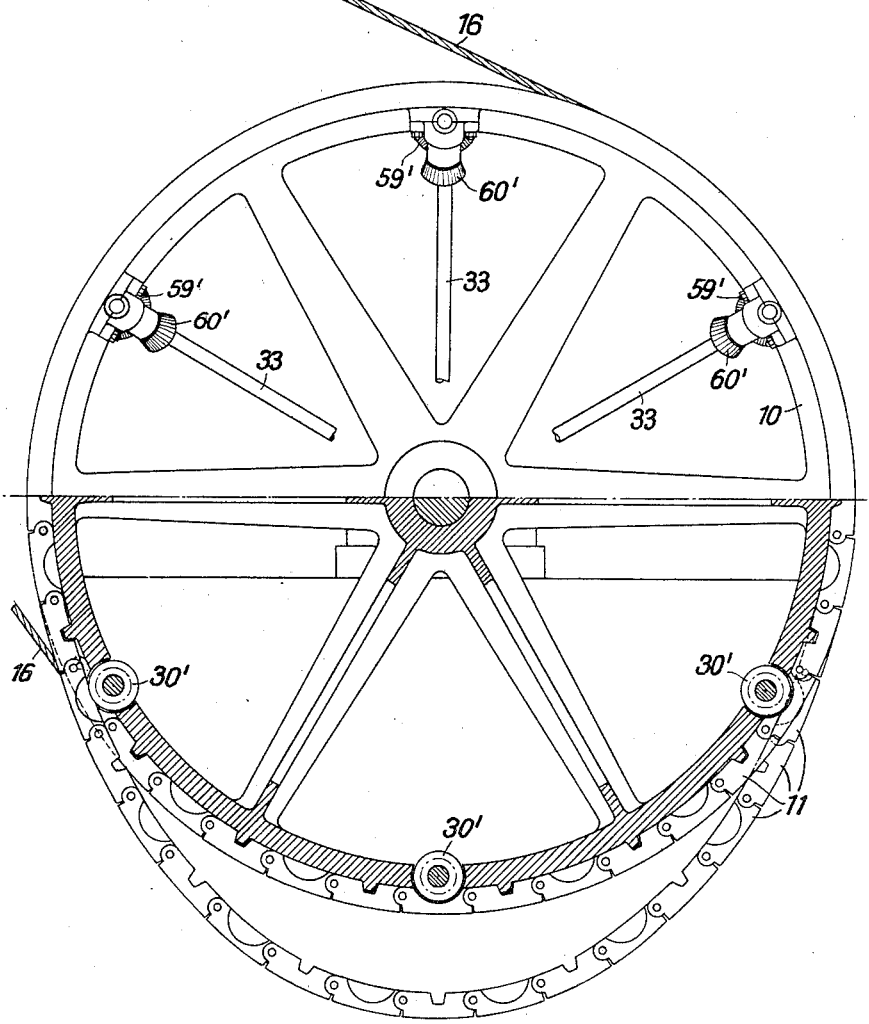
Figure 6 is an elevation partly in section of the form of the invention shown in Figure 5.

A particularly efficient constructional form of this idea is shown in Figs. 5 and 6 in vertical section and elevation. Here the pulley 10 has on its periphery divided displacing (shifting) worms 30' which are driven by pairs of bevel pinions 59', 60' shafts 33, bevel pinions 34', from the fixed central wheel 36. As here again the teeth projecting beyond the sectional profile of the chain shoes 11 in the first place will unfavourably increase the height of the shoes, so that the free sag for the chain loop would have to be increased and on the other hand would provide the possibility of entanglement, the teeth are as illustrated in Figs. 5 and 6, shifted into the interior of the sectional profile. In this case there corresponds to the one direction of winding on of the chain (right hand winding on) the one direction of feed of the displacer device, and to the other direction of winding on (left hand winding) the other direction of feed of the displacer device.

The loop of chain shoes is in this case guided according to Fig. 6 so that in the event of a pulley or drum hoist for shafts, with lengths of rope 16 running obliquely to the pulley on the hoisting framework, the chain of shoes is on the one side of the point where the rope runs off run free (empty) for about one-third of the periphery, and on the other side for about two-thirds of the periphery in order to permit of free crossing by the pass-over loop, with corresponding sag over the lengths of chain lying on the lower half of the driving pulley 10. It may here be expressly pointed out that by this additional winding of the chain of shoes round the pulley the work of transverse shift is practically not increased, because the free lengths of chain are not under the load of the rope tension.

If this new drive is compared with previous pulley drives or rope haulage, in which the rope only surrounds half the periphery of the pulley, then the following is evident: while maintaining all advantages of pulley haulage especially as regards the fact that the rope remains constantly lying in the same central plane and with only one curve (bend) of the rope, an increase of the encirclement of the pulley to three times the amount is secured whereby all imaginable requirements of actual operation for increase of the frictional grip are more than amply provided for.

Having thus ascertained the nature of my said invention and in what manner it is to be performed, I declare that what I claim and desire by Letters Patent of the United States is:

1. Friction drive mechanism of the class described, comprising a pulley, an endless band arranged around said pulley in several convolutions, a tension element having a portion thereof coiled about the pulley and bearing on the band so that said tension element is spaced from the periphery of the pulley by the band, the said band hanging in a bight below the pulley from that point at which the tension element leaves the pulley to that point at which the tension element engages the pulley, said hanging bight crossing the space between those turns which are on the under side of the pulley and means cooperating simultaneously throughout the length of convolutions for uniformly laterally displacing the convolutions of the band on the pulley with each revolution of the pulley to a width corresponding to that of the band and in a direction opposite the tendency of the winding up movement.

2. Friction drive mechanism of the class described, comprising a pulley, an endless band arranged around said pulley in several convolutions, a tension element having a portion thereof coiled about the pulley and bearing on the band so that said tension element is spaced from the periphery of the pulley by the band, the said band hanging in a bight below the pulley from that point at which the tension element leaves the pulley to that point at which the tension element engages the pulley, said hanging bight crossing the space between those turns which are on the under side of the pulley, said endless band comprising shoe links flexibly connected together and on the outer side of which the tension element engages, and means cooperating simultaneously throughout the length of convolutions for uniformly laterally displacing the convolutions of the band on the pulley to the extent of the width of a shoe link for each revolution of the pulley.

3. A friction drive as claimed in claim 2, in which the shoe links taper cross-sectionally from points intermediate their inner and outer peripheries to such inner and outer peripheries to prevent interference of the bight portion of the band with the other portions thereof.

4. A friction drive as claimed in claim 2, in which the shoe links taper cross-sectionally from points intermediate their inner and outer peripheries to such inner and outer peripheries to prevent interference of the bight portion of the band with the other portions thereof, said pulley having peripheral projections and said shoe links of the band having recesses in their inner sides for engagement by said projections.

5. Friction drive mechanism of the class described, comprising a pulley, an endless band arranged around said pulley in several convolutions, a tension element having a portion thereof coiled about the pulley and bearing on the band so that said tension element is spaced from the periphery of the pulley by the band, the said band hanging in a bight below the pulley from that point at which the tension element leaves the pulley to that point at which the tension element engages the pulley, said hanging bight crossing the space between those turns which are on the under side of the pulley, said endless band comprising shoe links flexibly connected together and on the outer side of which the tension element engages, and means for uniformly laterally displacing the convolutions of the band on the pulley to the extent of the width of a shoe link for each revolution of the pulley, said means comprising worms extending transversely of the pulley and having bearings therein, the threads of said worms engaging the peripheral portions of the chain links of said bearings, and means for rotating said worms as the pulley revolves.

OTTO OHNESORGE.